(12) United States Patent  
Cai et al.

(10) Patent No.: US 8,465,271 B2  
(45) Date of Patent: Jun. 18, 2013

(54) INJECTION MOLD

(75) Inventors: Gang-Fu Cai, Guang-Dong (CN);  
Ya-Bo Zou, Guang-Dong (CN); Xin-Jin Gui, Guang-Dong (CN); Kun-Hsueh Chiang, Tu-Cheng (TW)

(73) Assignee: Cheng Uei Precision Industry Co., Ltd., Tu-Cheng, Taipei Hsien (TW)

( * ) Notice: Subject to any disclaimer, the term of this patent is extended or adjusted under 35 U.S.C. 154(b) by 369 days.

(21) Appl. No.: 13/018,395

(22) Filed: Jan. 31, 2011

(65) Prior Publication Data  
US 2012/0195991 A1  Aug. 2, 2012

(51) Int. Cl.  
*B29C 45/14* (2006.01)

(52) U.S. Cl.  
USPC ........................................ 425/125; 425/129.1

(58) Field of Classification Search  
USPC ................. 425/116, 121, 125, 129.1; 249/83, 249/91, 95; 264/272.15  
See application file for complete search history.

(56) References Cited

U.S. PATENT DOCUMENTS  
8,192,190 B2 * 6/2012 Gong et al. .................... 425/125

FOREIGN PATENT DOCUMENTS  
CN  201566074  * 9/2010  
TW  378824  * 4/2010

* cited by examiner

*Primary Examiner* — Yogendra Gupta  
*Assistant Examiner* — Ninh Le  
(74) *Attorney, Agent, or Firm* — Cheng-Ju Chiang

(57) ABSTRACT

An injection mold for molding a product including an insert element, which includes a plurality of terminals each having a contacting portion, includes a male mold and a female mold movably engaged with the male mold. The male mold includes a male platen for fixing a fastening element therein. The fastening element defines a plurality of fastening grooves for fastening the contacting portions in a first male groove opened on the male platen. The male mold further includes a supporting element cooperating with the male platen to fixing a locating mold core in the male platen. A top end of the locating mold core projects into the first male groove and further defines a locating groove for fastening one contacting portion adjacent to a male sprue which is opened on the male platen and connected with the first male groove via a second male groove of the male platen.

6 Claims, 7 Drawing Sheets

INJECTION MOLD

BACKGROUND OF THE INVENTION

1. Field of the Invention

The present invention relates to a mold, and particularly to an injection mold having a locating mold core.

2. The Related Art

Generally, an injection mold is used to mold a product with an insert element. A conventional process of an insert molding includes the following steps: firstly, mounting the insert element in the injection mold; secondly, injecting thermoplastic resin into the injection mold; thirdly, cooling the thermoplastic resin in the injection mold to form the product with the insert element therein.

The injection mold defines a chamber for molding the product, a sprue connected with the chamber, and a fastening element mounted in the injection mold. An end of the fastening element projects into the chamber and further defines a plurality of fastening grooves communicating with the chamber. The insert element includes a plurality of terminals each further having a contacting portion. In a process of molding, the contacting portions are fastened in the fastening grooves of the fastening element and exposed in the chamber. However, as the contacting portions are fastened in chamber only by means of the fastening grooves, it's difficult for the contacting portion to be firmly fastened in the chamber. As a result, when the thermoplastic resin is injected into the chamber of the injection mold via the sprue, the contacting portions adjacent to the sprue are apt to move away from the initial position and even have a deformation caused by the excessive injection forces acting thereon.

SUMMARY OF THE INVENTION

Accordingly, an object of the present invention is to provide an injection mold. The injection mold is adapted for molding a product including an insert element. The insert element includes a plurality of terminals each having a contacting portion. The injection mold comprises a male mold and a female mold movably engaged with the male mold. The male mold includes a male platen having a top surface which includes a front top surface. A substantial middle portion of the front top surface defines a first male groove extending along a longitudinal direction perpendicular to a front-to-rear direction of the male platen. A rear of the first male groove extends rearward, and then toward two opposite directions to form a second male groove. A rear portion of a bottom side of the first male groove defines a cavity communicating with the second male groove. Two front portions of two opposite side surfaces of the cavity are concaved oppositely to form two clipping grooves with top ends thereof communicating with the first male groove. The front top surface defines a male sprue extending along the longitudinal direction with one end thereof connected with the second male groove and the other end thereof penetrating through a side of the male platen. The side surface of the cavity further defines a first fixing groove adjacent to the male sprue. A fastening element has a fastening body mounted in the front of the cavity, with two opposite side edges of the fastening body being inserted in the clipping grooves respectively, and a top end of the fastening body projecting into the first male groove of the male platen. The top end of the fastening body protrudes upward to form a plurality of fastening lumps abreast arranged at regular intervals along the longitudinal direction. A fastening groove is formed between two adjacent fastening lumps for fastening the contacting portion. A supporting element has a supporting body accommodated in the cavity and behind the fastening element. A side surface of the supporting body defines a second fixing groove cooperating with the first fixing groove to form a fixing groove together. A locating mold core has a base body fixed in the fixing groove, with a top end of the base body projecting into the first male groove of the male platen. The top end of the base body defines a locating groove aligned with one fastening groove for fixing one contacting portion adjacent to the male sprue.

As described above, the male mold further has the locating mold core mounted in the male mold platen to work as a locating element and further make one contacting portion, adjacent to the male sprue, firmly fastened in the corresponding locating groove. So that can avoid the contacting portion, adjacent to the male sprue, moving away from the initial position or even deforming when excessive injection forces acting on the corresponding contacting portion.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
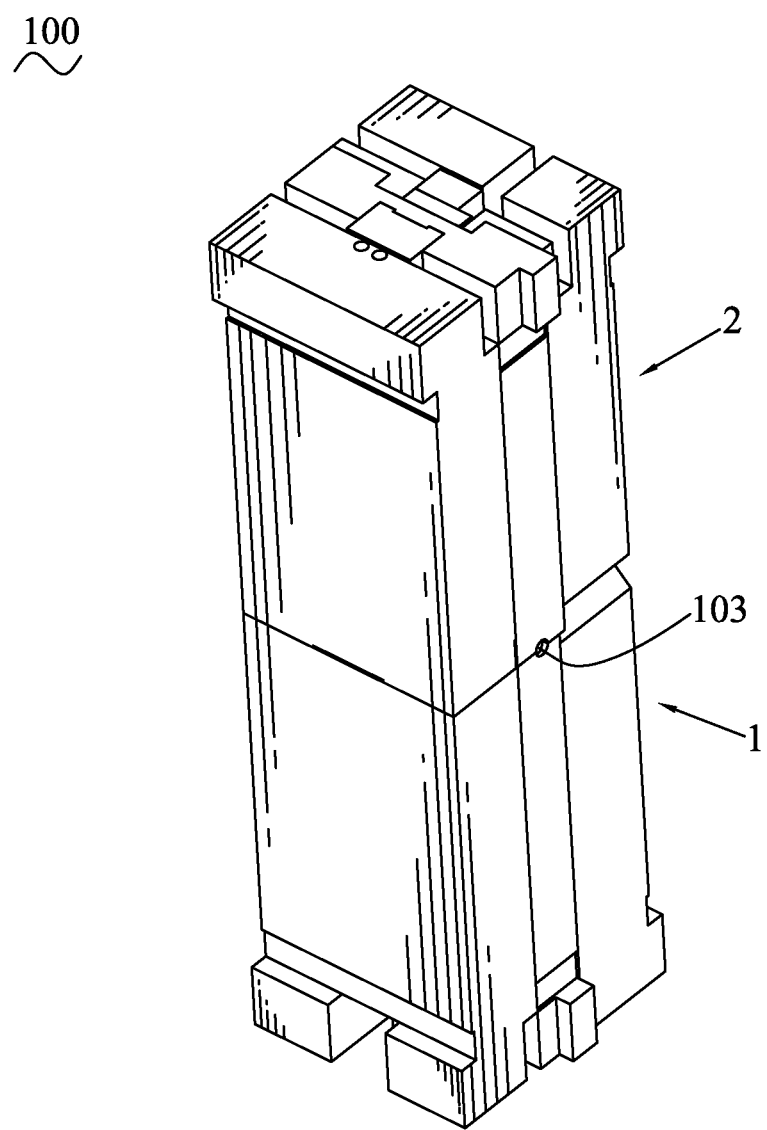
FIG. 1 is an assembled perspective view of an injection mold at a mold-closing position in accordance with the present invention.

Referring to the drawings in greater detail, and first to FIGS. 1-2, FIG. 4 and FIG. 6, the embodiment of the invention is embodied in an injection mold 100. The injection mold 100 adapted for molding a product including an insert element 90 includes a male mold 1 and a female mold 2 movably engaged with the male mold 1. The male mold 1 further includes a male platen 10, a pair of locating elements 20, a fastening element 30, a supporting element 40, and a locating mold core 50. The female mold 2 further includes a female platen 60, a first compression element 70, and a second compression element 80.

Figure 2:
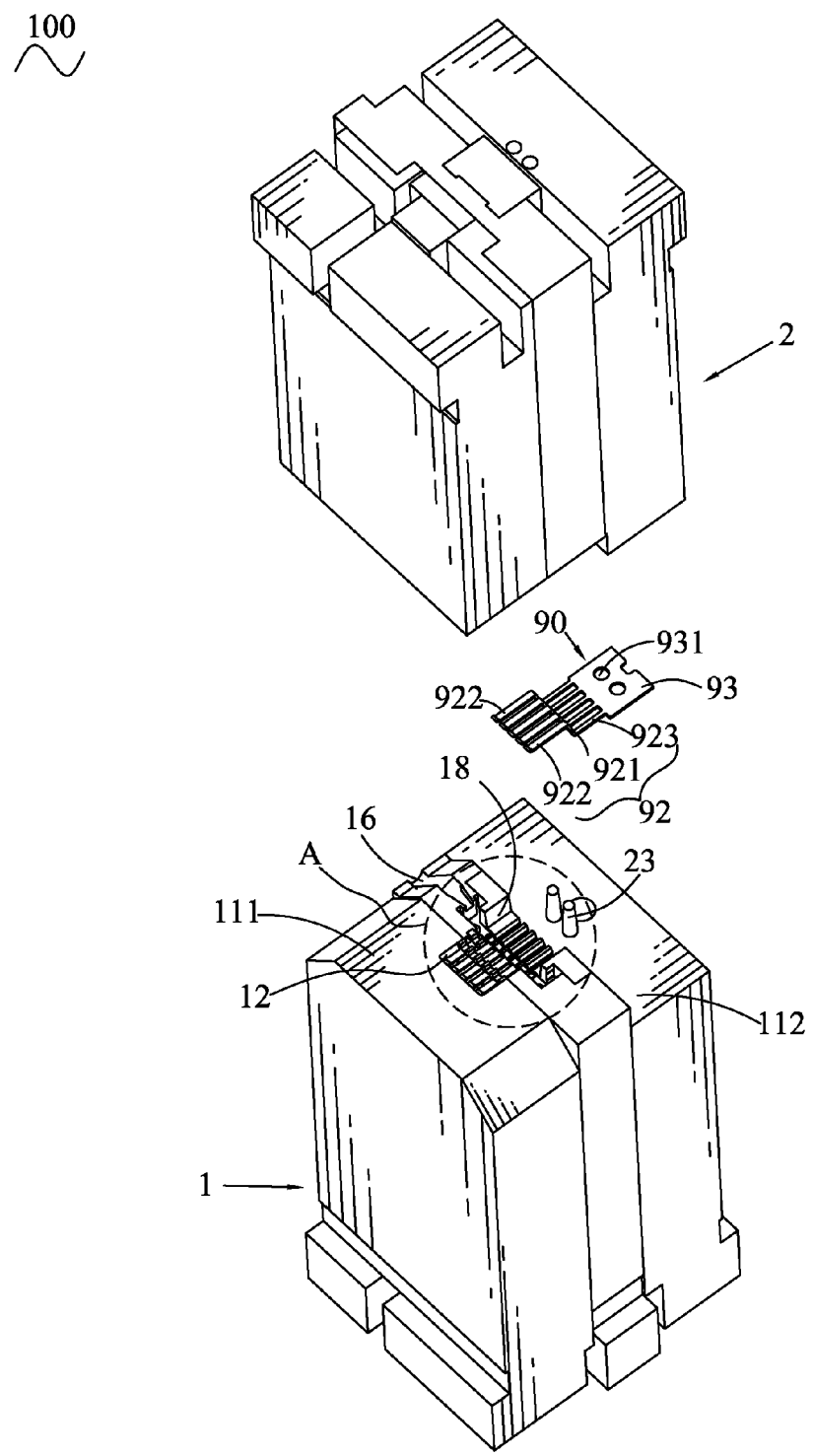
FIG. 2 is a perspective view of the injection mold of FIG. 1 at a mold-opening position.

Refer to FIG. 2. The insert element 90 includes a material belt 93 with two belt holes 931 formed therein, and a plurality of terminals 92 extending from a side edge of the material belt 93. Each terminal 92 has a soldering portion 923 with a rear end thereof connecting with the said side edge of the material belt 93, a fixing portion 921 bent and extended upward from a front end of the soldering portion 923, and a contacting portion 922 extending forward from a top end of the fixing portion 921.

Refer to FIGS. 2-4 and FIG. 7. The male platen 10 is of substantially cuboid configuration, and has a top surface 110 of substantial stair shape. The top surface 110 further includes a front top surface 111 and a rear top surface 112 being lower than the front top surface 111 viewed from a side view. A substantial middle portion of the front top surface 111 defines a first male groove 12 extending along a longitudinal direction perpendicular to a front-to-rear direction of the male platen 10. A rear of the first male groove 12 extends rearward, and then toward two opposite directions to form a second male groove 13. The depth of the second male groove 13 is deeper than the one of the first male groove 12. A rear portion of a bottom side of the first male groove 12 defines a cavity 14 penetrating downward through the male platen 10. Two front portions of two opposite side surfaces of the cavity 14 are oppositely concaved to form two clipping grooves 15 extending vertically with top ends thereof communicating with the first male groove 12. The front top surface 111 defines a male sprue 16 extending along the longitudinal direction, with one end thereof connected with the second male groove 13 and the other end thereof penetrating through a side of the male platen 10. One side surface of the cavity 14 adjacent to the male sprue 16 defines a first fixing groove 17 extending vertically. A substantial middle of a rear portion of the front top surface 111 defines an opening 18 connected with a rear side of the second male groove 13 and corresponding to the first male groove 12. A bottom side of the opening 18 is concaved downward to form a plurality of fixed grooves 181 abreast arranged at regular intervals along the longitudinal direction and further communicating with the second male groove 13. A substantial middle portion of the rear top surface 112 defines a pair of locating holes 19 corresponding to the opening 18 and further penetrating downward through the male platen 10.

Figure 4:
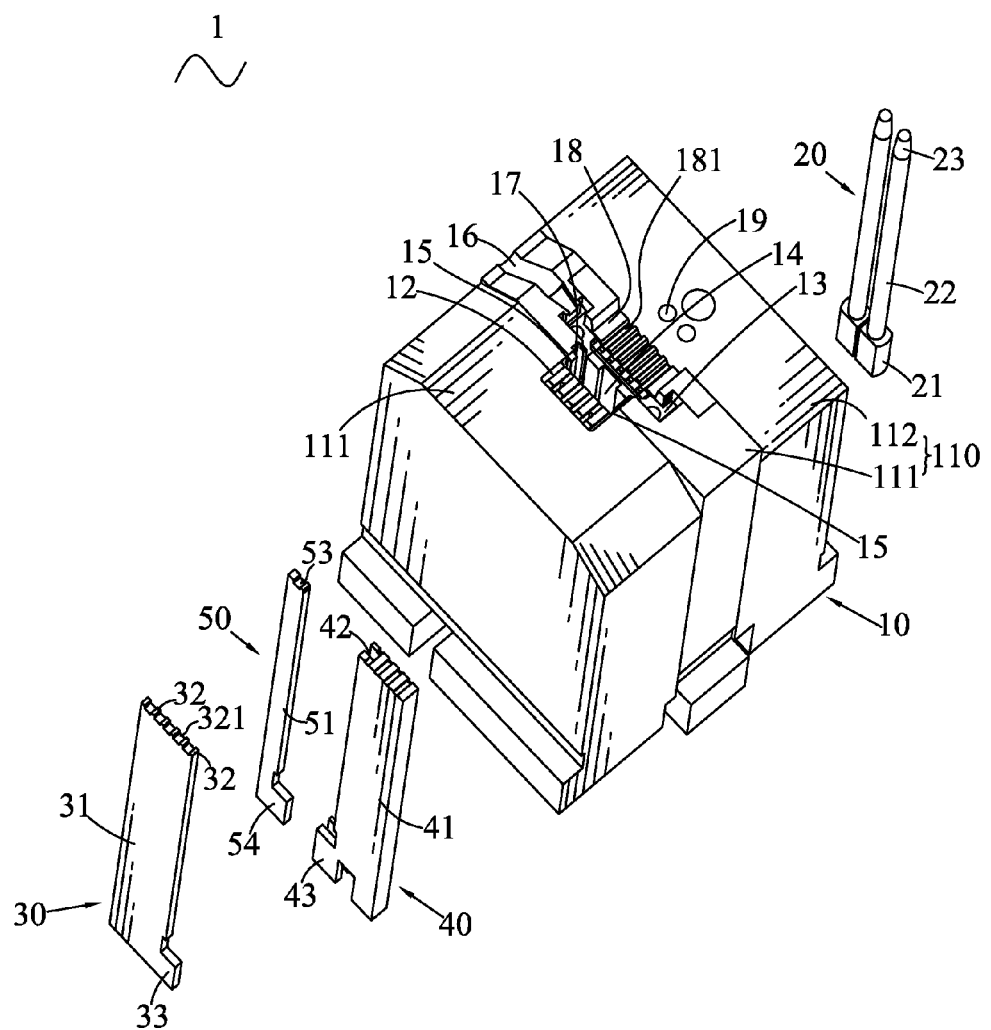
FIG. 4 is an exploded, perspective view of a male mold of the injection mold of FIG. 2.

Refer to FIG. 2 and FIG. 4. Each locating element 20 has a locating base 21 abutting against a bottom end of the locating hole 19. A middle of a top of the locating base 21 extends upward to form a cylindrical locating portion 22 inserted in the locating hole 19. A top of the locating portion 22 protrudes upward to form a tapered locating head 23 projecting out of the locating hole 19, and exposed beyond the rear top surface 112 of the male platen 10.

Refer to FIG. 2 and FIG. 4 again. The fastening element 30 has a fastening body 31 of rectangular plate shape mounted in the cavity 14, with a top end of the fastening body 31 being projected into the first male groove 12 of the male platen 10, and two opposite side edges of the fastening body 31 being inserted in the clipping grooves 15 respectively. The top end of the fastening body 31 protrudes upward to form a plurality of fastening lumps 32 abreast arranged at regular intervals along the longitudinal direction. A fastening groove 321 is formed between two adjacent fastening lumps 32 for fastening the contacting portion 922 of the terminal 92. A lower portion of the fastening body 31 protrudes outward to form a propping portion 33 for abutting against an inner sidewall of the male platen 10.

Figure 3:
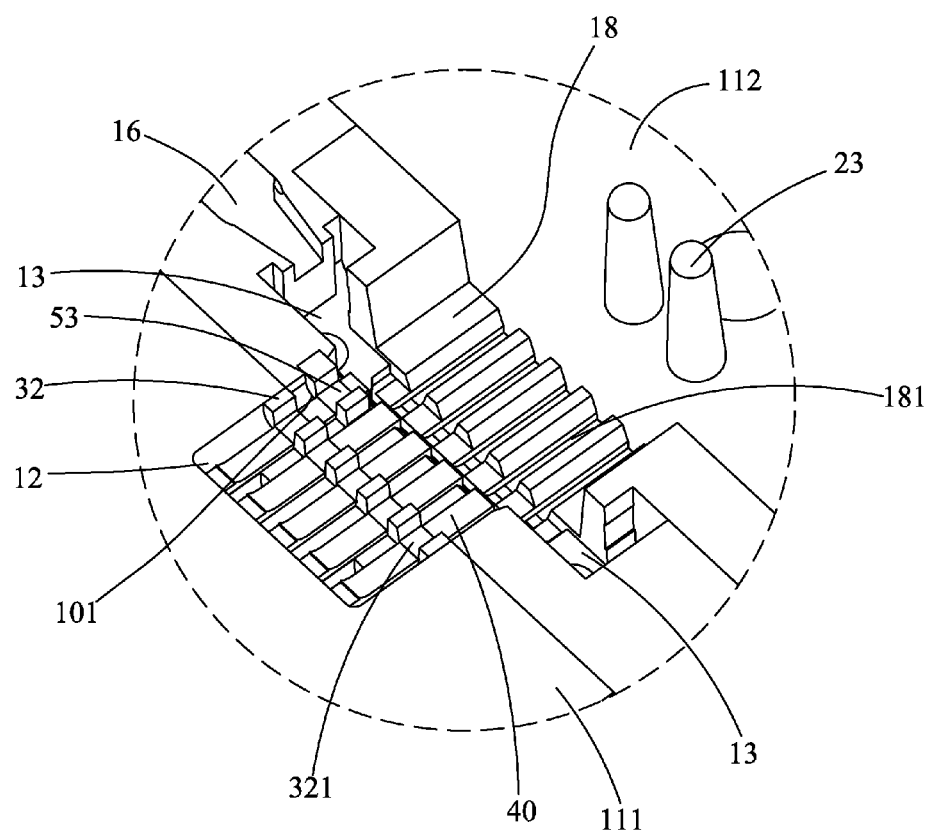
FIG. 3 is a partially enlarged view of an enclosed portion labeled A shown in FIG. 2.

Refer to FIGS. 2-4. The supporting element 40 has a supporting body 41 of rectangular plate shape accommodated in the cavity 14. A side surface of the supporting body 41 defines a second fixing groove 42 extending vertically to penetrate through the supporting body 41 and capable of cooperating with the first fixing groove 17 to form a fixing groove 101 when the supporting body 41 of the supporting element 40 is accommodated in the cavity 14 of the male platen 10. A lower portion of the supporting body 41 protrudes outward to form a supporting portion 43 for abutting against an inner sidewall of the male platen 10.

Refer to FIG. 2 and FIG. 4. The locating mold core 50 has a base body 51 of long plate shape fixed in the fixing groove 101, with a top end of the base body 51 projecting into the first male groove 12. The top end of the base body 51 defines a locating groove 53 corresponding to one fastening groove 321 for fixing one contacting portion 922. A lower portion of the base body 51 protrudes outward to form a locating plate 54 for abutting against an inner sidewall of the male platen 10.

Figure 5:
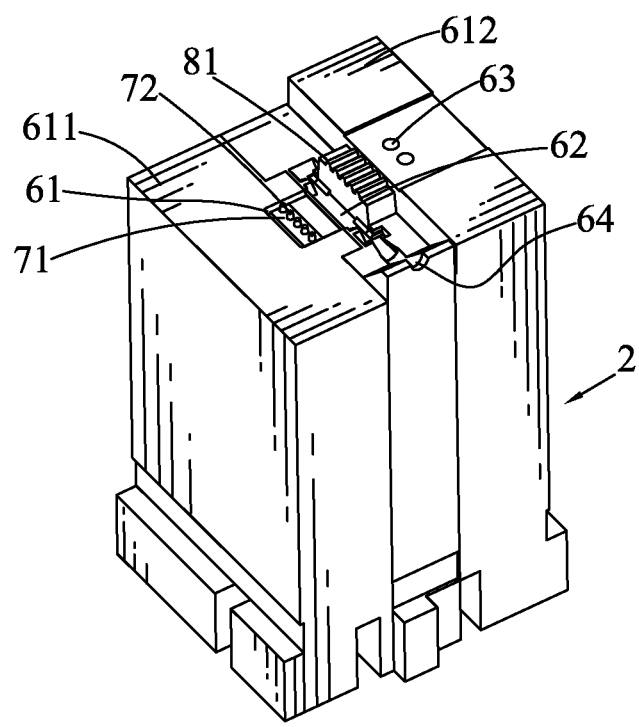
FIG. 5 is an assembled, perspective view of a female mold of the injection mold of FIG. 2.
Figure 6:
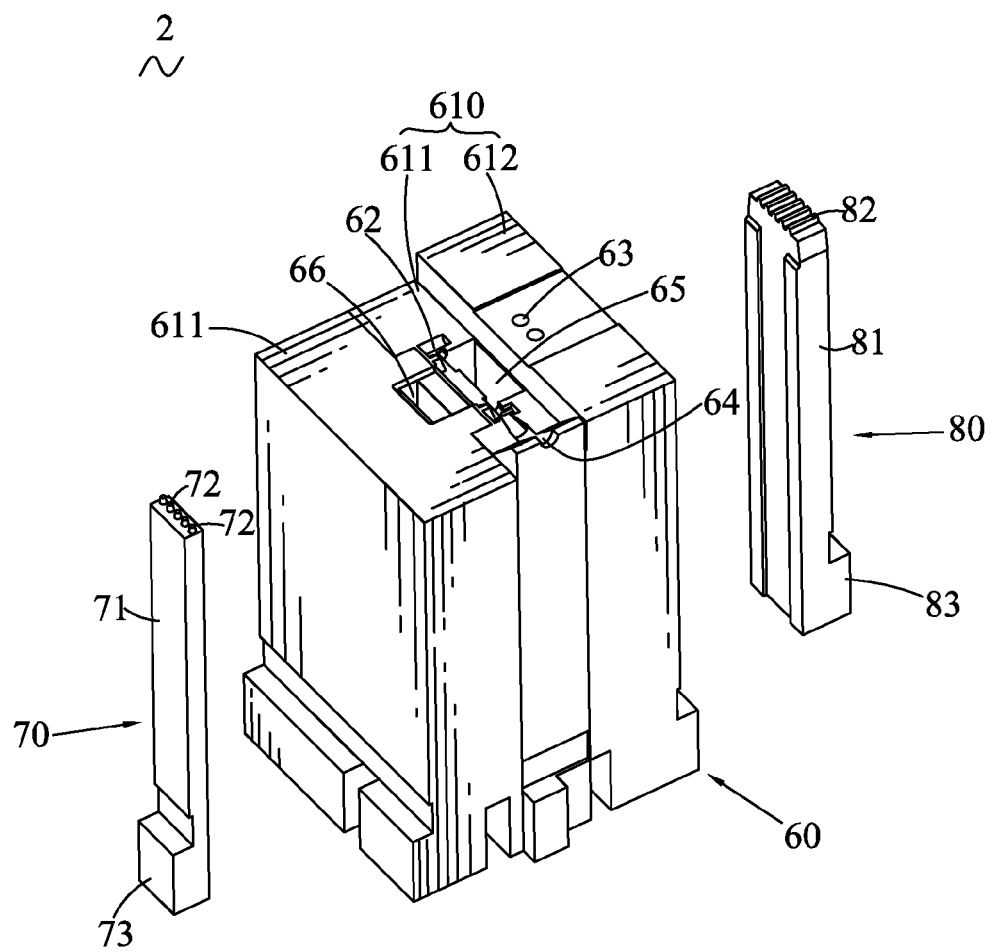
FIG. 6 is an exploded, perspective view of the female mold of FIG. 5.
Figure 7:
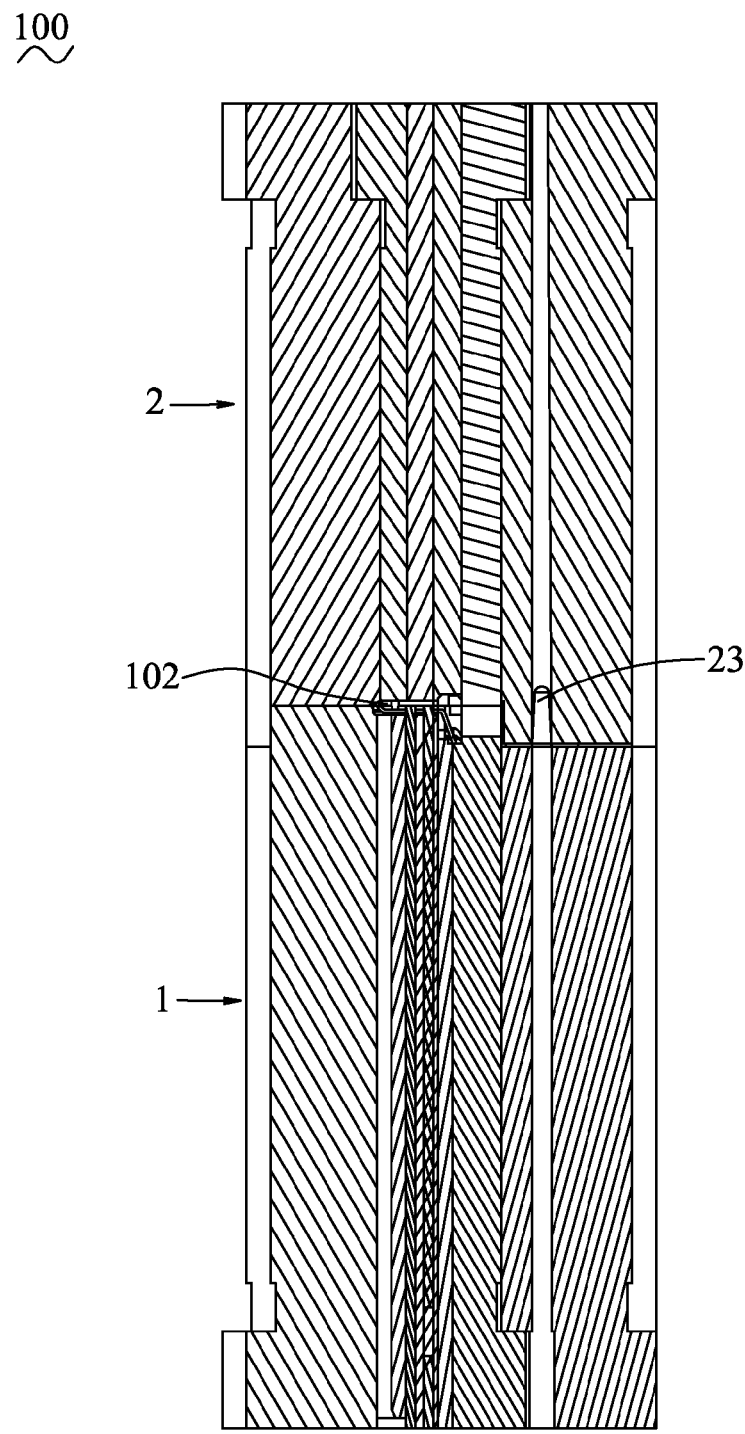
FIG. 7 is a cross-sectional view of the injection mold of FIG. 1.

Refer to FIG. 5 and FIG. 6. The female platen 60 is of cuboid configuration, and defines a bottom surface 610 of substantial stair shape which further includes a front bottom surface 611 and a rear bottom surface 612 being lower than the front bottom surface 611 viewed from the side view. A substantial middle portion of the front bottom surface 611 of the bottom surface 610 is concaved upward to form a first female groove 61. A rear of the first female groove 61 extends rearward, and then toward two opposite directions to form a second female groove 62. The depth of the second female groove 62 is deeper than the one of the first female groove 61. A substantial middle portion of the rear bottom surface 612 of the bottom surface 610 defines two receiving holes 63 for accommodating the corresponding locating heads 23 of the locating elements 20 therein. The front bottom surface 611 defines a female sprue 64 extending along the longitudinal direction, with one end thereof being connected with the second female groove 62 and the other end thereof penetrating through a side of the female platen 60. A substantial middle of a rear of the front bottom surface 611 defines a first accommodating groove 65 extending vertically to penetrate through the female platen 60 and having a bottom end connected with a rear side of the second female groove 62. A front portion of the first female groove 61 further extends upward to define a second accommodating groove 66 penetrating upward through the female platen 60.

Refer to FIG. 5 and FIG. 6 again. The first compression element 70 has a first fastening base 71 of rectangular plate shape accommodated in the second accommodating groove 66. A bottom end of the first fastening base 71 protrudes downward to form a plurality of compression pillars 72 abreast arranged at regular intervals along the longitudinal direction. The compression pillars 72 project into the first female groove 61, with distal ends of the compression pillars 72 extending underneath the front bottom surface 611 of the bottom surface 610. An upper portion of the first fastening base 71 protrudes outward to form a first fastening portion 73 for abutting against an inner sidewall of the female platen 60.

Refer to FIG. 5 and FIG. 6 again. The second compression element 80 has a second fastening base 81 of rectangular plate shape received in the first accommodating groove 65, with a bottom end of the second fastening base 81 projecting underneath the front bottom surface 611. The bottom end of the second fastening base 81 protrudes downward to form a plurality of substantially bar-shaped compression blocks 82 abreast arranged at regular intervals along the longitudinal direction. An upper portion of the second fastening base 81 protrudes outward to form a second fastening portion 83 for abutting against an inner sidewall of the female platen 60.

Refer to FIGS. 1-2, FIG. 5 and FIG. 7. In use of the injection mold 100, the insert element 90 is mounted in the male platen 10. The locating heads 23 of the locating elements 20 are inserted into the belt holes 931 to avoid a movement of the insert element 90. A middle portion of the contacting portion 922 of each terminal 92 is fastened in the fastening grooves 321 to avoid a rotation of the contacting portion 922, with one contacting portion 922 being fastened in the locating groove 53. The soldering portion 923 of each terminal 92 is mounted in the fixed groove 181 to avoid a movement and rotation of the soldering portion 923. As a result, the insert element 90 can be firmly located in the male mold 1 without any movements. Then the female mold 2 will engage with the male mold 1. When the injection mold 100 is at a mold-closing position, the front top surface 111 of the top surface 110 matches with the corresponding front bottom surface 611 of the bottom surface 610, the rear top surface 112 of the top surface 110 matches with the corresponding rear bottom surface 612 of the bottom surface 610. The locating heads 23 are inserted into the receiving holes 63 respectively. The first male groove 12 and the second male groove 13 respectively engage with the first female groove 61 and the second female groove 62 to form a chamber 102 thereamong. The male sprue 16 matches up with the corresponding female sprue 64 to form a sprue 103 therebetween. The distal ends of the compression pillars 72 project into the fastening grooves 321 and further abut against the contacting portions 922 to avoid the contacting portions 922 moving up and down. The bottom end of the second fastening base 81 engages with the opening 18 of the male platen 10, with the compression blocks 82 accommodated in the fixed grooves 181 and further abutting against the soldering portions 923, so that can make a rear end of the chamber 102 is completely sealed.

As described above, the male mold 1 further has the locating mold core 50 mounted in the male mold platen 10 to work as a locating element and further make one contacting portion 922, adjacent to the male sprue 16, firmly fastened in the corresponding locating groove 53. So that can avoid the contacting portion 922, adjacent to the male sprue 16, moving away from the initial position or even deforming when excessive injection forces acting on the corresponding contacting portion 922 mentioned above.

The foregoing description of the present invention has been presented for the purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. An injection mold adapted for molding a product including an insert element, the insert element including a plurality of terminals each having a contacting portion, the injection mold comprising a male mold and a female mold movably engaged with the male mold, the male mold including:
   a male platen having a top surface which includes a front top surface, a substantial middle portion of the front top surface defining a first male groove extending along a longitudinal direction perpendicular to a front-to-rear direction of the male platen, a rear of the first male groove extending rearward, and then toward two opposite directions to form a second male groove, a rear portion of a bottom side of the first male groove defining a cavity communicating with the second male groove, two front portions of two opposite side surfaces of the cavity being concaved oppositely to form two clipping grooves with top ends thereof communicating with the first male groove, the front top surface defining a male sprue extending along the longitudinal direction with one end thereof connected with the second male groove and the other end thereof penetrating through a side of the male platen, the side surface of the cavity further defining a first fixing groove adjacent to the male sprue;
   a fastening element having a fastening body mounted in the front of the cavity, with two opposite side edges of the fastening body being inserted in the clipping grooves respectively, and a top end of the fastening body projecting into the first male groove of the male platen, the top end of the fastening body protruding upward to form a plurality of fastening lumps abreast arranged at regular intervals along the longitudinal direction, a fastening groove being formed between two adjacent fastening lumps for fastening the contacting portion;
   a supporting element having a supporting body accommodated in the cavity and behind the fastening element, a side surface of the supporting body defining a second fixing groove cooperating with the first fixing groove to form a fixing groove together; and
   a locating mold core having a base body fixed in the fixing groove, with a top end of the base body projecting into the first male groove of the male platen, the top end of the base body defining a locating groove aligned with one fastening groove for fixing one contacting portion adjacent to the male sprue.

2. The injection mold as claimed in claim 1, wherein the top surface further includes a rear top surface lower than the front top surface, a female platen defines a bottom surface which includes a front bottom surface and a rear bottom surface lower than the front bottom surface, when the injection mold is at a mold-closing position, the front top surface of the top surface matches with the corresponding front bottom surface of the bottom surface, the rear top surface of the top surface matches with the corresponding rear bottom surface.

3. The injection mold as claimed in claim 2, wherein a substantial middle portion of the front bottom surface of the bottom surface is concaved upward to form a first female groove, a rear of the first female groove extends rearward, and then toward two opposite directions to form a second female groove, when the injection mold is at the mold-closing position, the first male groove and the second male groove respectively engage with the first female groove and the second female groove to form a chamber.

4. The injection mold as claimed in claim 3, wherein a front portion of a top side of the first female groove defines a second accommodating groove, the female mold includes a first compression element which has a first fastening base accommodated in the second accommodating groove, a bottom end of the first fastening base protrudes downward to form a plurality of compression pillars abreast arranged at regular intervals along the longitudinal direction, the compression pillars project underneath the first female groove, when the injection mold is at the mold-closing position, distal ends of the compression pillars project into the fastening grooves and further abut against the contacting portions.

5. The injection mold as claimed in claim 1, wherein each terminal has a soldering portion connected with a rear end of the contacting portion, a substantial middle of a rear portion of the front top surface defines an opening connected with a rear of the second male groove, a bottom side of the opening defines a plurality of fixed grooves abreast arranged at regular intervals and further communicating with the second male groove, the soldering portion of each terminal is mounted in one of the plurality of fixed grooves.

6. The injection mold as claimed in claim 5, wherein a female platen has a front bottom surface mating with the front top surface of the male platen, a substantial middle of a rear of the front bottom surface defines a first accommodating groove penetrating upward through the female platen, the female mold further includes a second compression element, the second compression element has a second fastening base received in the first accommodating groove, with a bottom end of the second fastening base projecting underneath the front bottom surface, the bottom end of the second fastening base protrudes downward to form a plurality of compression blocks abreast arranged at regular intervals along the longitudinal direction, the bottom end of the second fastening base engages with the opening of the male platen, with the compression blocks received in the fixed grooves and further abutting against the corresponding contacting portions.

* * * * *